(12) United States Patent
Cortequisse

(10) Patent No.: US 10,280,758 B2
(45) Date of Patent: May 7, 2019

(54) COMPOSITE COMPRESSOR BLADE FOR AN AXIAL-FLOW TURBOMACHINE

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 501 days.

(21) Appl. No.: 15/053,465

(22) Filed: Feb. 25, 2016

(65) Prior Publication Data

US 2016/0258297 A1 Sep. 8, 2016

(30) Foreign Application Priority Data

Mar. 5, 2015 (BE) .................................. 2015/5121

(51) Int. Cl.
| | |
|---|---|
| F01D 5/14 | (2006.01) |
| F04D 29/02 | (2006.01) |
| F01D 9/04 | (2006.01) |
| F04D 29/54 | (2006.01) |
| F01D 5/28 | (2006.01) |
| F04D 29/32 | (2006.01) |

(52) U.S. Cl.
CPC ............. F01D 5/147 (2013.01); F01D 5/282 (2013.01); F01D 9/041 (2013.01); F04D 29/023 (2013.01);
(Continued)

(58) Field of Classification Search
CPC .......... F01D 5/147; F01D 5/282; F01D 9/041; F04D 29/023; F04D 29/324;
(Continued)

(56) References Cited

U.S. PATENT DOCUMENTS

| 4,006,999 A | 2/1977 | Brantley et al. |
| 4,772,450 A * | 9/1988 | Friedman .............. B22F 3/1216 29/889.7 |

(Continued)

FOREIGN PATENT DOCUMENTS

| EP | 0764764 A1 | 3/1997 |
| EP | 1450006 A1 | 8/2004 |

(Continued)

OTHER PUBLICATIONS

Search Report dated Oct. 23, 2015 for BE 201505121.

*Primary Examiner* — David E Sosnowski
*Assistant Examiner* — Eric J Zamora Alvarez
(74) *Attorney, Agent, or Firm* — James E. Walton

(57) ABSTRACT

A composite vane for a low-pressure compressor of an axial-flow turbomachine, wherein the vane comprises a platform and an aerodynamic airfoil having a leading edge and a trailing edge. The airfoil extends into the primary flow of the turbomachine. The airfoil includes a body extending from the leading edge to the trailing edge and a reinforcement of the leading edge of the airfoil. The reinforcement comprises a reinforcing sheet, which extends from the leading edge to the trailing edge, and which is arranged in the thickness of the body in such a way as to reinforce it. In addition, the reinforcement comprises a shell forming the leading edge and which is integral with the sheet. The sheet is a titanium sheet, and the body includes a composite material having an organic matrix charged with fibers. This configuration improves the rigidity and the resistance to corrosion while lightening the airfoil.

16 Claims, 3 Drawing Sheets

(52) U.S. Cl.
CPC ......... *F04D 29/324* (2013.01); *F04D 29/542* (2013.01); *F05D 2220/32* (2013.01); *F05D 2230/22* (2013.01); *F05D 2230/31* (2013.01); *F05D 2240/12* (2013.01); *F05D 2240/121* (2013.01); *F05D 2240/301* (2013.01); *F05D 2240/303* (2013.01); *F05D 2240/80* (2013.01); *F05D 2300/133* (2013.01); *F05D 2300/603* (2013.01); *Y02T 50/672* (2013.01); *Y02T 50/673* (2013.01)

(58) Field of Classification Search
CPC ............... F04D 29/542; F05D 2220/32; F05D 2230/22; F05D 2230/31; F05D 2240/12; F05D 2240/121; F05D 2240/301; F05D 2240/303; F05D 2240/80; F05D 2300/133; F05D 2300/603; Y02T 50/672
See application file for complete search history.

(56) References Cited

U.S. PATENT DOCUMENTS

| | | | | |
|---|---|---|---|---|
| 5,096,384 A | * | 3/1992 | Immell | B29C 70/345 156/172 |
| 7,189,064 B2 | * | 3/2007 | Helder | B23K 20/122 416/232 |
| 7,334,997 B2 | * | 2/2008 | Karafillis | F01D 5/16 416/223 A |
| 7,547,194 B2 | * | 6/2009 | Schilling | F01D 5/147 29/889.71 |
| 7,980,817 B2 | * | 7/2011 | Foose | F01D 5/147 415/191 |
| 8,585,368 B2 | * | 11/2013 | Viens | F01D 5/147 416/191 |
| 2010/0104446 A1 | * | 4/2010 | Vehr | F01D 5/147 416/226 |
| 2013/0224040 A1 | * | 8/2013 | Straccia | F01D 5/141 416/242 |
| 2014/0314550 A1 | * | 10/2014 | Jenkinson | F01D 9/042 415/148 |

FOREIGN PATENT DOCUMENTS

| | | |
|---|---|---|
| EP | 1764476 A2 | 3/2007 |
| EP | 1887187 A2 | 2/2008 |
| EP | 1980714 A2 | 10/2008 |
| EP | 2182168 A1 | 5/2010 |
| EP | 2243929 A2 | 10/2010 |
| EP | 2256296 A2 | 12/2010 |

* cited by examiner

COMPOSITE COMPRESSOR BLADE FOR AN AXIAL-FLOW TURBOMACHINE

This application claims priority under 35 U.S.C. § 119 to Belgium Patent Application No. 2015/5121, filed 5 Mar. 2015, titled "Composite Compressor Blade for an Axial-Flow Turbomachine," which is incorporated herein by reference for all purposes.

BACKGROUND

1. Field of the Application

The present application relates to the field of turbomachine airfoils for aircraft. More specifically, the present application relates to composite airfoils having a reinforcement structure. The present application also relates to an axial-flow turbomachine having an airfoil according to the present application.

2. Description of Related Art

The compressors and the turbines of an axial-flow turbomachine each comprise a plurality of annular rows of rotor airfoils. The latter make it possible to speed up, slow down, rectify or even deflect an annular flow of air. These actions make it possible to compress the flow, or to recover driving energy from it. The airfoils must be light in weight in order to reduce the mass of the turbomachine, in particular in the aeronautical field. Lightening is also synonymous with reducing the inertia of the rotor.

The optimization of the mass of an airfoil must nevertheless comply with criteria in respect of mechanical strength and thermal resistance. An airfoil must resist vibrations and possibly ingestions into the turbomachine. In addition, the rotor airfoils are confronted with centrifugal forces. In order to produce custom-made airfoils which meet the requirements described above, it is known to design airfoils fitted with reinforcements.

Document EP1450006A1 discloses a compressor airfoil of an aircraft turbofan engine. The airfoil exhibits a body and a reinforcement for its leading edge. The body is made of a composite material charged with fibres, whereas the reinforcement is made of metal. The applied reinforcement is partially anchored in the airfoil, which permits the airfoil to be protected against erosion in the area of its leading edge. Nevertheless, the resistance to impacts and the overall rigidity of such an airfoil remain limited. The presence of skins on the external surfaces makes the airfoil heavier.

Although great strides have been made in the area of composite compressor blades, many shortcomings remain.

DETAILED DESCRIPTION OF THE PREFERRED EMBODIMENT

Figure 1:
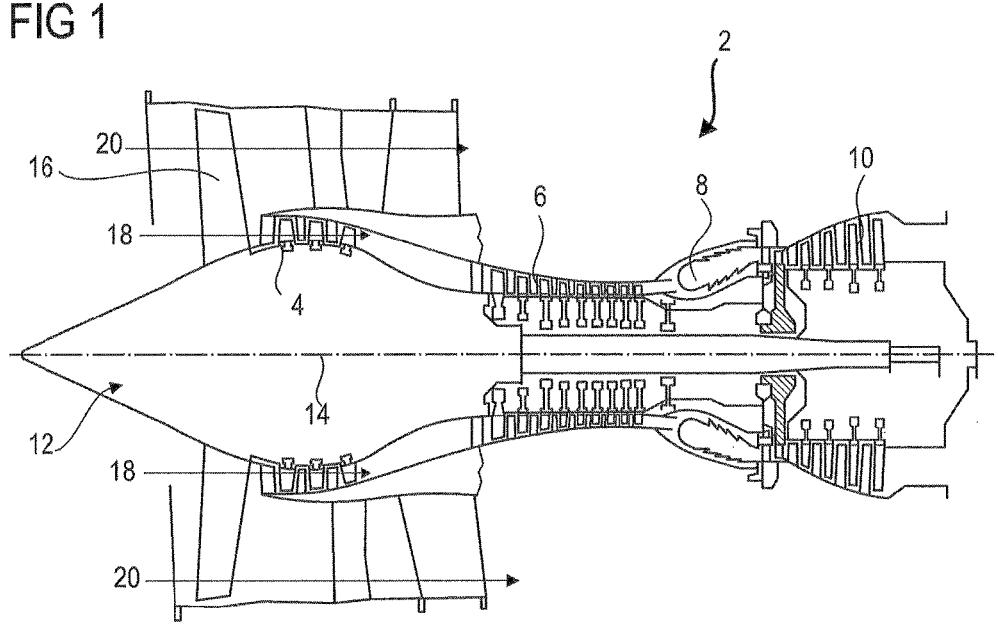
FIG. 1 represents an axial-flow turbomachine according to the present application.

The present application aims to solve at least one of the problems posed by the prior art. More specifically, the aim of the present application is to improve the rigidity of a turbomachine airfoil. The aim of the present application is also to optimize the resistance, the mass, the cost and the geometry of a turbomachine airfoil.

In general, the present application proposes an airfoil having a reinforcement ply, or sheet, having two blocks, or body portions, to either side of the sheet, the ply forming the trailing edge and the leading edge of the airfoil by being thickened on said latter edge, the blocks forming the intrados surface and the extrados surface of the airfoil.

The object of the present application is a composite airfoil for a turbomachine, in particular for a compressor of an axial-flow turbomachine, the airfoil comprising a paddle intended to extend radially into a flow of the turbomachine, the paddle including a leading edge, a trailing edge and a body positioned between the leading edge and the trailing edge, and a reinforcement forming the leading edge of the paddle, characterized in that the reinforcement of the leading edge comprises a reinforcing sheet which extends from the leading edge to the trailing edge and which is arranged in the thickness of the body so as to pass through it.

According to one advantageous embodiment of the present application, the paddle comprises an intrados surface and an extrados surface which extend from the leading edge to the trailing edge, the sheet sweeping the majority, preferably essentially the whole of the intrados surface and the whole of the extrados surface of the airfoil, the body possibly forming, at least partially, the intrados surface and/or the extrados surface of the paddle.

According to one advantageous embodiment of the present application, the reinforcement comprises an upstream portion, in particular a protective shell, forming the leading edge of the airfoil, the sheet and said upstream portion being joined, the sheet and said upstream portion preferably being made of the same material.

According to one advantageous embodiment of the present application, the upstream portion forms a layer of material of a thickness that is for the most part constant, the sheet possibly extending further downstream than the body.

According to one advantageous embodiment of the present application, the sheet comprises a granular material, the reinforcement preferably being made by additive manufacturing, possibly powder-based.

According to one advantageous embodiment of the present application, the sheet is metallic, possibly comprising titanium, and the body is made of a polymer material, possibly charged with fibres.

According to one advantageous embodiment of the present application, the reinforcement forms an insert arranged at least partially in the body, the sheet separating the body into two parts, the reinforcement comprising apertures formed in the sheet, the parts of the body preferably exhibiting a continuity of material via the apertures.

According to one advantageous embodiment of the present application, the body covers the two faces of the sheet, preferably on the majority of the surface of each face of the sheet.

According to one advantageous embodiment of the present application, the sheet is a sheet which divides the body, and the sheet extends for the whole of the radial height of the leading edge and/or the whole of the radial height of the trailing edge of the airfoil.

According to one advantageous embodiment of the present application, the body exhibits a radial stack of aerodynamic profiles having mean camber lines, at least one or each mean camber line being arranged in the thickness of the sheet, and/or at least one or each mean camber line being parallel to the sheet.

According to one advantageous embodiment of the present application, the airfoil comprises a locking platform delimiting the reinforcement radially, the platform and the reinforcement being made of the same material, the platform possibly comprising a plate having an edge such as to delimit a space in the interior of the platform.

According to one advantageous embodiment of the present application, the airfoil comprises a locking tab, possibly arranged radially on the other side of the locking platform, the locking tab extending the sheet radially and comprising locking means, such as a locking aperture, intended to interact with an internal stator shroud.

According to one advantageous embodiment of the present application, the platform comprises reinforcement ribs as an additional material thickness on the plate of the platform and which extend as far as the area of the sheet, and/or a three-dimensional space-frame structure reinforcing the platform, and/or a solid block intended to be welded to a support.

According to one advantageous embodiment of the present application, the platform comprises an extension of the sheet, the plate of the platform separating the sheet from the extension, the extension being surrounded by the edge of the plate, the platform possibly comprising a locking pin connected to the extension of the sheet, or the locking pin being situated at a distance radially from the extension of the sheet.

According to one advantageous embodiment of the present application, the body matches each surface of the faces of the sheet, possibly on all the surfaces of the faces of the sheet.

According to one advantageous embodiment of the present application, the sheet exhibits essentially a constant thickness, on the majority or on essentially the whole of its thickness.

According to one advantageous embodiment of the present application, the sheet forms the trailing edge of the airfoil, possibly on the whole of its radial height.

According to one advantageous embodiment of the present application, the sheet is cambered, and/or twisted, and/or curved.

According to one advantageous embodiment of the present application, the thickness of the sheet is less than half the mean thickness of the paddle of the airfoil.

According to one advantageous embodiment of the present application, the thickness of the sheet and/or the thickness of the shell is/are less than or equal to 1 mm, preferably less than or equal to 0.50 mm, and more preferably less than or equal to 0.25 mm, if possible less than or equal to 0.10 mm.

According to one advantageous embodiment of the present application, the parts of the body form the majority of the intrados surface and of the extrados surface.

According to one advantageous embodiment of the present application, the maximum thickness of the upstream portion of the reinforcement is greater than or equal to the mean thickness of the body or of one of the parts of the body.

According to one advantageous embodiment of the present application, the reinforcement and the body form a block of solid material.

According to one advantageous embodiment of the present application, the reinforcement, in particular its upstream part and/or the shell, extends from the intrados surface and from the extrados surface of the airfoil.

According to one advantageous embodiment of the present application, the surface of at least one or of each face of the sheet is generally smooth.

According to one advantageous embodiment of the present application, the reinforcement and the body are made of two different materials, the material of the body preferably exhibiting a density lower than that of the material of the reinforcement, and more preferably at least two times less dense.

The present application also has as its object a turbomachine comprising at least one airfoil, characterized in that the at least one airfoil is according to the present application, said airfoil preferably being an airfoil of a rectifier for a low-pressure compressor.

The present application makes it possible to increase the rigidity of the airfoil thanks to the presence of the reinforcing sheet. Its presence makes it possible to form a composite airfoil with two different materials, so as to provide both rigidity and lightness. The aerodynamic profiles of the airfoil are thus less likely to become arched or to become flattened under the effect of the flowing of the fluid. The sheet and the body may be made of two different materials such as to dampen the vibrations.

Treatment of the leading edge limits the erosion, of course, but it also makes it possible to stiffen the sheet by forming a reinforcement angle there so as to prevent flexing towards the intrados or the extrados. Conversely, the sheet prevents the upstream portion from becoming deformed towards the downstream portion. The sheet and the upstream portion are thus mutually reinforcing. Their perpendicular connection optimizes this reinforcement. The reinforcement plays a structural role as an internal strengthening member.

In addition to lightening the sheet, the apertures of the sheet increase the cohesion of the body since it traverses these apertures. The alignment of the apertures makes it possible to maintain the rigidity of the sheet by the provision of reinforcement zones.

In the following description, the expressions interior or internal and exterior or external refer to a position in relation to the axis of rotation of an axial-flow turbomachine. The axial direction corresponds to the direction along of the axis of rotation of the turbomachine.

FIG. 1 represents a gas turbine engine, for instance an axial-flow turbomachine represented in a simplified manner. The engine in this particular case is a turbofan engine. The turbofan engine 2 comprises a first level of compression, known as a low-pressure compressor 4, a second level of compression, known as a high-pressure compressor 6, a combustion chamber 8 and one or a plurality of levels of turbines 10. In operation, the mechanical power of the turbine 10 transmitted via the central shaft to the rotor 12 sets the two compressors 4 and 6 in motion. The latter include a plurality of rows of rotor airfoils associated with rows of stator airfoils. The rotation of the rotor about its axis of rotation 14 thus makes it possible to generate a flow of air and to compress the latter progressively until it arrives at the entrance to the combustion chamber 8. Gear reduction mechanism may be used to increase the speed of rotation transmitted to the compressors.

An inlet fan, commonly referred to as a fan or blower, 16 is coupled to the rotor 12 and generates a flow of air which is divided into a primary flow 18 passing through the various above-mentioned levels of the turbomachine, and a secondary flow 20 passing through an annular conduit (partially represented) along the machine before rejoining the primary flow at the exit from the turbine. The secondary flow may be accelerated so as to generate a thrust reaction. The primary flow 18 and the secondary flow 20 are annular flows, and they are channelled through the casing of the turbomachine. For this purpose, the casing exhibits cylindrical walls or shrouds which may be internal and external.

Figure 2:
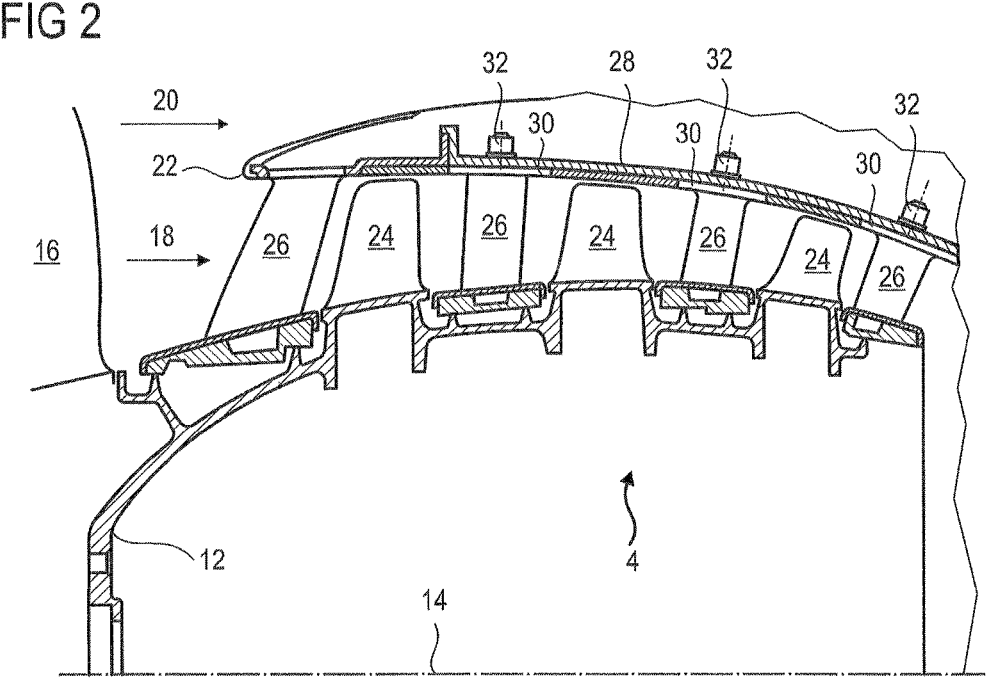
FIG. 2 is a diagram of a compressor for a turbomachine according to the present application.

FIG. 2 is a view in cross section of a compressor of an axial-flow turbomachine such as that depicted in FIG. 1. The compressor may be a low-pressure compressor 4. The separation lip 22 of the primary flow 18 and of the secondary flow 20 may be observed there. The rotor 12 comprises a plurality of rows of rotor airfoils 24, being three in this particular case.

The compressor 4 comprises a plurality of rectifiers, being four in this particular case, each of which contains an annular row of stator airfoils 26. The rectifiers are associated with the fan or with a row of rotor airfoils 24 in order to rectify the flow of air, so as to convert the velocity of the flow into a static pressure.

The stator airfoils 26 extend essentially radially from an exterior casing 28, and they may be locked in position there with the help of their locking platforms 30 which are pressed against the external wall of the casing 28. For this purpose, the locking platforms 30 may comprise a locking pin 32 or a block of material intended to be welded to the casing 28 or to an external shroud. The locking pins 32 may be connected by a lock bolt or a nut.

Figure 3:
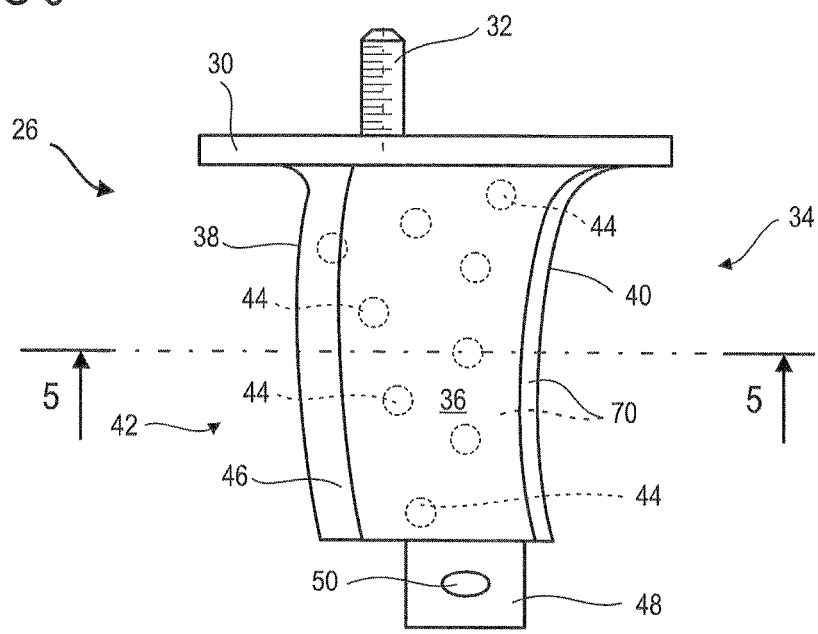
FIG. 3 illustrates an airfoil according to the present application.

FIG. 3 represents an airfoil according to the present application, such as an airfoil of the compressor represented in FIG. 2. The airfoil is observed laterally, in the circumferential direction. The airfoil which is represented here is a stator airfoil 26, although it could also be a rotor airfoil, for example welded to a drum. The airfoil could be a turbine airfoil.

The airfoil 26 comprises a paddle 34 intended to extend radially into the primary annular flow 18 of the turbomachine. The paddle 34 includes a body 36 having a leading edge 38 and a trailing edge 40, an intrados surface and an extrados surface, these surfaces extending from the leading edge 38 to the trailing edge 40. The intrados surface is incurved to deflect the flow 18, in order to speed it up or to slow it down.

The paddle 34 includes in addition a reinforcement 42 arranged at least partially in the body 36 so as to reinforce it. For this purpose, the reinforcement 42 exhibits a sheet 70 inserted in the thickness of the body 36 by passing through it from upstream to downstream. The sheet 70 extends from the leading edge 38 to the trailing edge 40 of the airfoil 26, for example for the whole of the radial height of the paddle 34 of the airfoil. The sheet 70 may extend perpendicularly to the whole of the intrados surface and to the whole of the extrados surface of the airfoil 26. The sheet 70 may comprise apertures 44 distributed over its surface. The apertures 44 are traversed by the body 36 in order to improve the cohesion between the sheet and the body.

Upstream, the reinforcement 42 may comprise an upstream portion 46 forming the leading edge 38. The upstream portion 46 is extended downstream by the sheet 70. The sheet 70 may form the trailing edge 40 of the airfoil, and may extend further downstream than the body 36. The reinforcement 42 may be made of the same material.

The airfoil 26 may comprise a locking platform 30, for example in the form of a plate. The platform 30 delimits the paddle 34 radially and permits the primary flow 18 to be delimited radially. The platform 30 may be extended by one or a plurality of locking pins 32.

The airfoil 26 may exhibit a locking tab 48, possibly having a locking means 50. The tab 48 may permit a shroud to be anchored there, for example an internal shroud essentially attached to the stator of a turbomachine by means of its associated row of airfoils 26. The tab 48 may exhibit an aperture 50 to permit the insertion there of a retaining means, such as a retaining plate, a strapping.

The reinforcement 42 may be made of a granular material, and is advantageously integral, for example made of the same material. The reinforcement 42 may be made by sintering, or in layers according to an additive manufacturing process in order to improve the mechanical strength, while offering considerable freedom of design and a homogeneity in respect of its material. The reinforcement 42 may also be produced by the welding of elements, or by casting. The airfoil 26 may be made by overmoulding a resin onto the reinforcement 42 so as to form the body at that point.

The reinforcement 42 may be made of a metal powder such as a titanium powder in order to offer resilience to impacts. It could also be produced in ceramic in order to increase the rigidity and the resistance to temperature. The body 36 may comprise a polymer material, such as a composite having an organic matrix charged with fibres, and/or a ceramic material, and/or a metallic material. The body 36 may comprise PEI, or PEEK.

Figure 4:
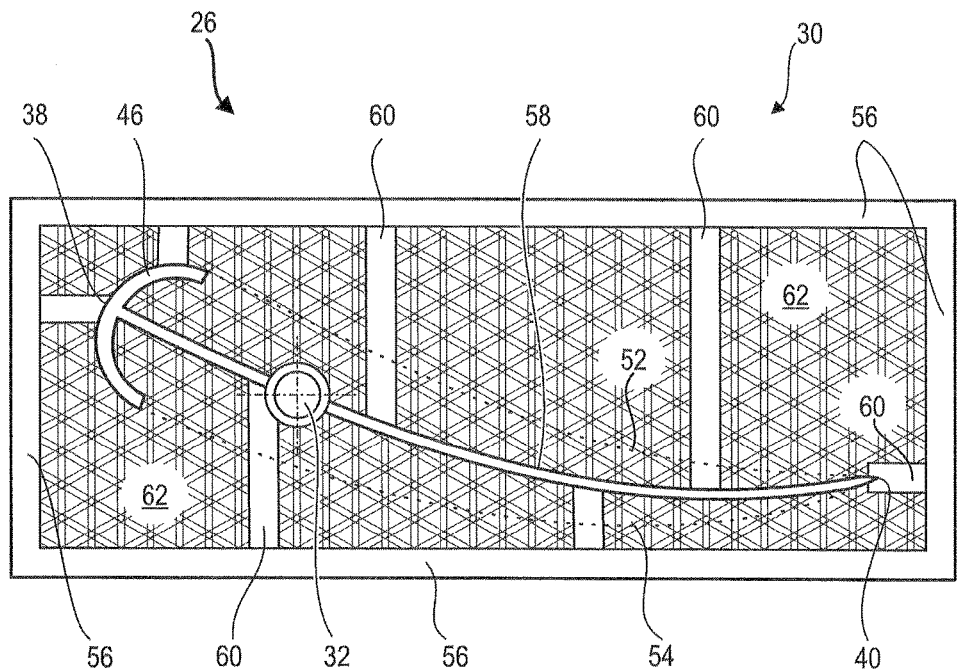
FIG. 4 illustrates a platform for an airfoil according to the present application.

FIG. 4 represents the platform 30 of the airfoil 26 represented in FIG. 3, the platform 30 being represented from the exterior. The paddle is represented via its intrados surface 52 and its extrados surface 54, which are marked with a dotted line.

The platform comprises a plate with an edge 56. The edge 56 forms a protruding part around the periphery of the plate. It surrounds a hollow space in the platform 30 that is delimited on one side by the plate. The platform 30 may comprise a radial extension 58 of the sheet and/or of the upstream portion arranged in the hollow space, the plate of the platform 30 being interposed between the sheet and the extension 58. This extension 58 provides a surplus of material reinforcing the airfoil 26 at the connection between the reinforcement and the platform 30.

The platform 30 may comprise a stiffening structure in its hollow zone. The structure may comprise ribs 60 and/or a three-dimensional space-frame 62. Such a space-frame 62 may comprise rods oriented in at least three directions in order to form a three-dimensional reference mark. The ribs 60, like the space-frame 62, may extend from the radial extension 58 towards the edge 56 of the platform 30, and they may be in contact with the locking pin 32. The stiffening structure may extend into the whole of the hollow space of the platform 30.

Certain ribs 60 may extend from the leading edge 38 and/or from the trailing edge 40 so as to connect the upstream edge 56 and the downstream edge 56 of the platform 30 via the radial extension 58.

Figure 5:
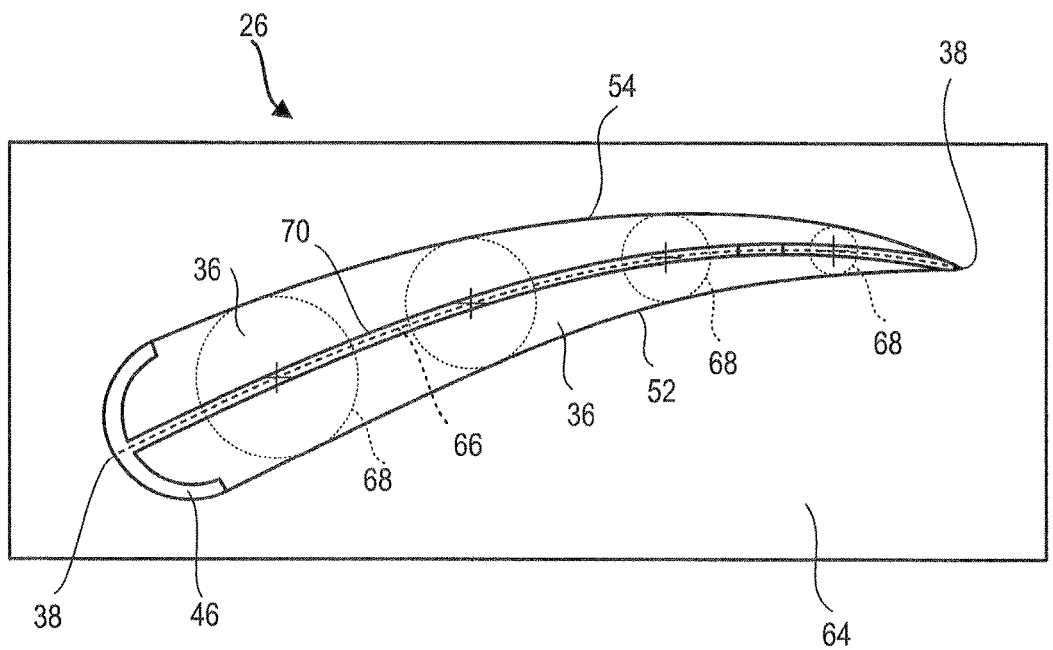
FIG. 5 outlines a section of the airfoil in the axis 5-5 marked in FIG. 3 according to the present application.

FIG. 5 outlines a section of the airfoil in the axis 5-5 marked on FIG. 3. The section is observed towards the exterior, the plate 64 of the platform 30 being visible. The paddle 34 of the airfoil 26 includes a radial stack of aerodynamic profiles, and the properties described in relation to the present figure may be observed on the majority of the aerodynamic profiles of the airfoil 26, or on substantially all the aerodynamic profiles of the airfoil. The intrados 52 is concave and the extrados 54 is convex. The mean camber line 66 is curved.

The expression mean camber line 66 may be used to denote the line formed, on a given airfoil profile, through the points which are situated midway between the extrados 54 and the intrados 52 as measured perpendicularly to this same line. The profile of the airfoil 26 may even be represented with the help of circles 68 which are inscribed in the profile of the airfoil, and which touch the intrados 52 and the extrados 54. The line which passes through all the centres of the circles 68 may be considered as the mean camber line 66.

The upstream portion 46 may extend towards the intrados 52 and towards the extrados 54 of the airfoil 26. Its thickness may be equal to the maximum thickness of the paddle. The upstream portion 46 may be a surface portion, such as plating, on the leading edge portion 38 of the paddle. The upstream portion 46 may be a shell 46 which forms a shield against erosion and against ingestions. The upstream portion 46 may cover the body 36, possibly each of its portions. The upstream portion 46 may even be a rod of material forming a thickening, a bead, on the upstream edge of the sheet 70.

The upstream portion 46 may form an angle or a gutter such as a half tube. The upstream portion 46 may cover the two faces of the sheet 70. It delimits a zone in which the sheet 70 is attached to the upstream portion 46 perpendicular to the leading edge 38. Material of the body 36 may be housed between the sheet 70 and a paddle of the upstream portion 46.

The sheet 70 forms an intermediate layer between the parts of the body 36. It is in contact with the body 36. It may separate the body 36 into two generally equal parts. For the majority of the length of at least one profile of the airfoil 26, the sheet 70 exhibits a zone where the thicknesses of the body parts are equal. The mean camber line 66 may be arranged in the thickness of the sheet 70, possibly in the middle. The faces of the sheet 70 are possibly parallel to the mean camber line 66. Optionally, the properties described above may be observed on the majority of the length of the sheet 70 or on the whole of its length.

The sheet 70 may exhibit a constant thickness, possibly over generally the whole of its surface. The thickness of the sheet may be comprised between 0.05 mm and 2.00 mm, preferably comprised between 0.10 mm and 0.50 mm. The sheet 70 may exhibit a constant thickness where it is covered by the body 36. Its clean surfaces, around the apertures, may be essentially smooth and/or flat. It may form a sheet which is warped and/or twisted, and/or locally curved. Its intrados and extrados surfaces match the portions of the body 36.

I claim:

1. A composite airfoil for an axial-flow turbomachine intended to project radially into a flow of the turbomachine, the airfoil comprising:
    a leading edge,
    a trailing edge,
    a composite body arranged between the leading edge and the trailing edge; and
    a reinforcement with an upstream portion having a C-shape radial section forming the leading edge of the airfoil, the upstream portion having a constant thickness,
wherein
the reinforcement further comprises a reinforcing sheet of essentially constant thickness,
the reinforcing sheet extending from the leading edge to the trailing edge and being arranged within the body so as to cross the body,
the reinforcing sheet including an edge of reduced thickness forming the trailing edge of the airfoil.

2. The composite airfoil of claim 1, wherein the body comprises an outer sharp trailing edge which is in contact with the constant thickness sheet.

3. The composite airfoil of claim 1, wherein the airfoil comprises an intrados surface and an extrados surface which extend from the leading edge to the trailing edge, the sheet extending along more than half of the intrados surface and more than half of the extrados surface.

4. The composite airfoil of claim 1, wherein the sheet and the upstream portion are integrally formed.

5. The composite airfoil of claim 1, wherein the sheet comprises a granular material, the reinforcement being made by additive manufacturing with powder.

6. The composite airfoil of claim 1, wherein the body is made of a polymer material charged with fibres.

7. The composite airfoil of claim 1, wherein the reinforcement forms an insert arranged at least partially in the body, the sheet separating the body into two parts, the reinforcement comprising apertures formed in the sheet.

8. The composite airfoil of claim 1, wherein the body covers more than half of a surface of each face of the sheet.

9. The composite airfoil of claim 1, wherein the sheet divides the body, and the sheet extends radially over the entirety of the leading edge and of the trailing edge of the airfoil.

10. The composite airfoil of claim 1, wherein the body exhibits a radial stack of aerodynamic profiles having mean camber lines, at least one or each mean camber line being arranged within the sheet.

11. The composite airfoil of claim 1, further comprising: a fixing platform delimiting the reinforcement radially, the fixing platform and the reinforcement being integrally formed.

12. The composite airfoil of claim 11, wherein the fixing platform comprises a plate with a surrounding edge such as to delimit a space within the fixing platform.

13. The composite airfoil of claim 1, further comprising a locking tab extending the sheet radially, the locking tab comprising: an aperture configured to fix an inner stator shroud.

14. The composite airfoil of claim 1, wherein the composite airfoil forms a stator vane.

15. The composite airfoil of claim 1, wherein the composite airfoil forms a rotor blade.

16. A gas turbine engine comprising at least one airfoil intended to project into a flow of the gas turbine engine, the airfoil comprising:
    a leading edge,
    a trailing edge,
    a body arranged between the leading edge and the trailing edge; and
    a reinforcement forming the leading edge of the airfoil,
wherein
the reinforcement of the leading edge comprises a reinforcing sheet which extends from the leading edge to the trailing edge and which is arranged within in the thickness of the body,
the reinforcing sheet including a trailing area with a constant thickness portion directly followed by a portion having a thickness progressively reducing from the constant thickness portion.

* * * * *